Oct. 23, 1956 W. P. McKAIN 2,767,599
TOOL DRESSING MACHINE
Filed Nov. 17, 1955 3 Sheets-Sheet 1

INVENTOR
Walter P. McKain

Oct. 23, 1956  W. P. McKAIN  2,767,599
TOOL DRESSING MACHINE
Filed Nov. 17, 1955  3 Sheets-Sheet 3

INVENTOR
Walter P. McKain

United States Patent Office 2,767,599
Patented Oct. 23, 1956

2,767,599

TOOL DRESSING MACHINE

Walter P. McKain, Parkersburg, W. Va., assignor to Stardrill-Keystone Company, Beaver Falls, Pa., a corporation of Pennsylvania Application November 17, 1955, Serial No. 547,450

8 Claims. (Cl. 76—5)

This invention relates to a tool dressing machine and embodies features materially increasing the speed of operation and efficiency of tool dressing machines heretofore existing and also considerably enlarging the field of usefulness of such tool dressing machines.

A tool dressing machine the general type of that disclosed in the present application is disclosed in copending application Serial No. 512,764, filed June 2, 1955. That tool dressing machine comprises an elongated tool receiving bed, a guideway extending generally transversely of the bed, a head movable in the guideway and means for moving the head, together with a dressing die and a trimming die in the guideway each having cooperative die parts adapted to be relatively angularly turned in one direction to open the die and render it inoperative and to be relatively angularly turned in the opposite direction to close the die and render it operative and links connecting the die parts of the dressing and trimming dies to the head so that the dressing and trimming dies are at all times operated synchronously upon movement of the head in the guideway. A tool to be dressed first has its cutting end heated to forging temperature, then is disposed in the bed and after being so disposed has its heated cutting end introduced into the dies which are closed upon the tool with the dressing die at the operative extremity or bit end of the tool and the trimming die alongside the dressing die but spaced somewhat therefrom in the direction away from the bit end of the tool. After the tool has been dressed as explained in detail in said copending application it is drawn in a direction parallel to its length away from the dressed end so that the dressed end of the tool passes first through the dressing die and then through the trimming die, the latter trimming off flash.

Tool dressing machines of the type disclosed in said copending application have proved highly successful in use. Occasionally, however, it has become necessary to disconnect the trimming die from the die operating head because the trimming die will not close upon the portion of a tool disposed within it when the dressing die is to be closed upon the bit end of the tool. Since it is necessary to close the dressing die to dress the tool the trimming die must be left open during the dressing operation and after the tool has been dressed and drawn at least partially through the dressing die the trimming die can be reconnected to the head and then closed about the tool for trimming of the tool. An example of a situation in which the trimming die cannot be closed during dressing of the tool is when the tool has very short water courses which terminate at points intermediate the dressing die and the trimming die. This may happen with a tool which has been dressed many times and has become so short that the bit end of the tool approaches very closely to the remote ends of the water courses.

While the tool dressing machine of said copending application may be used for dressing and trimming even a tool having short water courses as above described by disconnecting the trimming die from the die operating head so that the trimming die can remain open during the dressing operation, it is undesirable to have to do the work and devote the time necessary to disconnect and later reconnect the trimming die.

I now provide a tool dressing machine obviating the disadvantage of the machine of said copending application in that disconnection and reconnection of the trimming die are rendered unnecessary. In my improved tool dressing machine the dressing and trimming dies may operate synchronously as in the machine of said copending application but by a single operation the machine may be adapted to operate the dressing die while the trimming die remains open. My tool dressing machine comprises a dressing die having cooperative die parts adapted to be separated to render the dressing die in operative and moved into cooperative relationship to render the dressing die operative, means for moving the dressing die parts into cooperative relationship, a trimming die having cooperative die parts adapted to be separated to render the trimming die inoperative and moved into cooperative relationship to render the trimming die operative, means for moving the trimming die parts into cooperative relationship and connecting means movable between operative position connecting the second mentioned means to the first mentioned means so that the trimming die is rendered operative when the dressing die is rendered operative and inoperative position disconnecting the second mentioned means from the first mentioned means so that the trimming die remains in inoperative position when the dressing die is rendered operative. The means for moving the trimming die parts into cooperative relationship may include linkage connected with the first mentioned means, and control means may be provided which may be movable between a first position in which it constitutes a connection between the first mentioned means and the linkage causing operation of the linkage to move the trimming die to operative position when the dressing die is moved to operative position and a second position in which it is inoperative so that the linkage turns without moving the trimming die to operative position when the dressing die is moved to operative position.

The means for moving the dressing die parts into cooperative relationship may include a movable head and means may be connected with the head for moving the trimming die parts into cooperative relationship when the dressing die parts are moved into cooperative relationship and means may be mounted for shiftable movement to alter the connection of the last mentioned means with the head so that the trimming die remains in inoperative position when the dressing die parts are moved into cooperative relationship. Bracket means may be pivoted to the head, and means may be provided selectively fastening the bracket means to the head to move as a unit with the head and releasing the bracket means to move pivotally relatively to the head upon movement of the head, and connections may be provided between the bracket means and the trimming die parts whereby the trimming die parts are moved into cooperative relationship upon movement of the head to move the dressing die parts into cooperative relationship when the bracket means are fastened to the head and the trimming die parts remain in inoperative position upon movement of the head to move the dressing die parts into cooperative relationship when the bracket means are released to move pivotally relatively to the head. I preferably utilize link the dressing die and render it operative, a trimming die parts whereby the trimming die parts are moved into cooperative relationship upon movement of the head to move the dressing die parts into cooperative relationship when the bracket means are fastened to the head and the trimming die parts remain in inoperative position upon movement of the head to move the dressing die parts into cooperative relationship when the bracket means are released to move pivotally relatively to the head.

In a preferred structure my tool dressing machine comprises an elongated tool receiving bed, a guideway extending generally transversely of the bed, a head movable in the guideway, means for moving the head, a dressing die in the guideway having cooperative die parts adapted to be relatively angularly turned in one direction to open the dressing die and render it inoperative and to be relatively angularly turned in the opposite direction to close the dressing die and render it operative, a trimming die in the guideway having cooperative die parts adapted to be relatively angularly turned in one direction to open the trimming die and render it inoperative and to be relatively angularly turned in the opposite direction to close the trimming die and render it operative, two dressing die operating links respectively pivoted at one end to the head and at the other end to the respective dressing die parts to relatively angularly turn the dressing die parts upon movement of the head, two arms respectively pivoted to the head, two trimming die operating links respectively pivoted at one end to the respective arms and at the other end to the respective trimming die parts and means selectively fastening the arms against pivotal movement relatively to the head to cause the arms to form in effect unitary portions of the head immovable with respect thereto and releasing the arms for pivotal movement relatively to the head, so that when the arms are thus fastened the trimming die parts are relatively angularly turned upon movement of the head and when the arms are released the trimming die parts may remain open despite movement of the head and the arms and trimming die operating links may partake of relative movement about their respective pivotal connections during movement of the head without moving the trimming die parts. I preferably employ an operating member and latches operatively connected with the operating member to be moved thereby selectively into respective operative positions fastening the respective arms against pivotal movement relatively to the head to cause the arms to form in effect unitary portions of the head immovable with respect thereto and into respective inoperative positions releasing the respective arms for pivotal movement relatively to the head. I desirably provide two arms respectively pivoted to the head and adapted to lie generally in end-to-end relation to each other along the head with a portion of each arm atop the head, the arms being pivoted to the head at the adjacent ends of the arms, two trimming die operating links respectively pivoted at one end to the respective outer portions of the arms and at the other end to the respective trimming die parts and means selectively holding the arms down against the head to prevent pivotal movement of the arms relatively to the head and cause the arms to form in effect unitary portions of the head immovable with respect thereto and releasing the arms for pivotal movement relatively to the head, so that when the arms are thus held the trimming die parts are relatively angularly turned upon movement of the head and when the arms are released the trimming die parts may remain open despite movement of the head and the arms and trimming die operating links may partake of relative movement about their respective pivotal connections during movement of the head without moving the trimming die parts.

Other details, objects and advantages of the invention will become apparent as the following description of a present preferred embodiment thereof proceeds.

In the accompanying drawings I have shown a present preferred embodiment of the invention in which Figure 1 is a fragmentary vertical transverse cross-sectional view through a tool dressing machine with no tool in place in the machine and looking toward the dies, the dressing die and trimming die being closed;

Figure 6 is a fragmentary longitudinal cross-sectional view taken on the line VI—VI of Figure 1.

Figure 1:
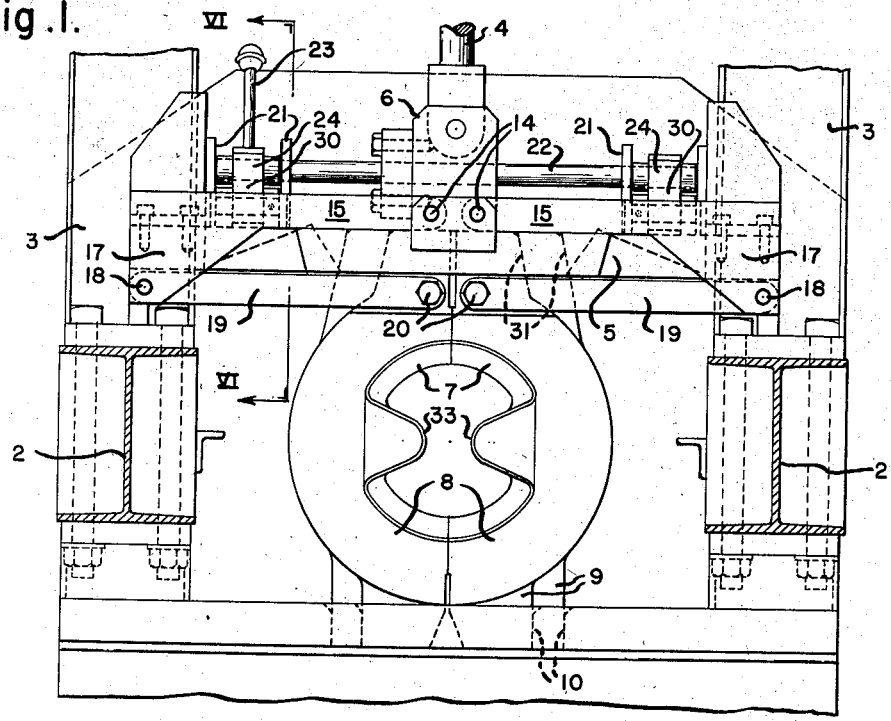
Figure 2:
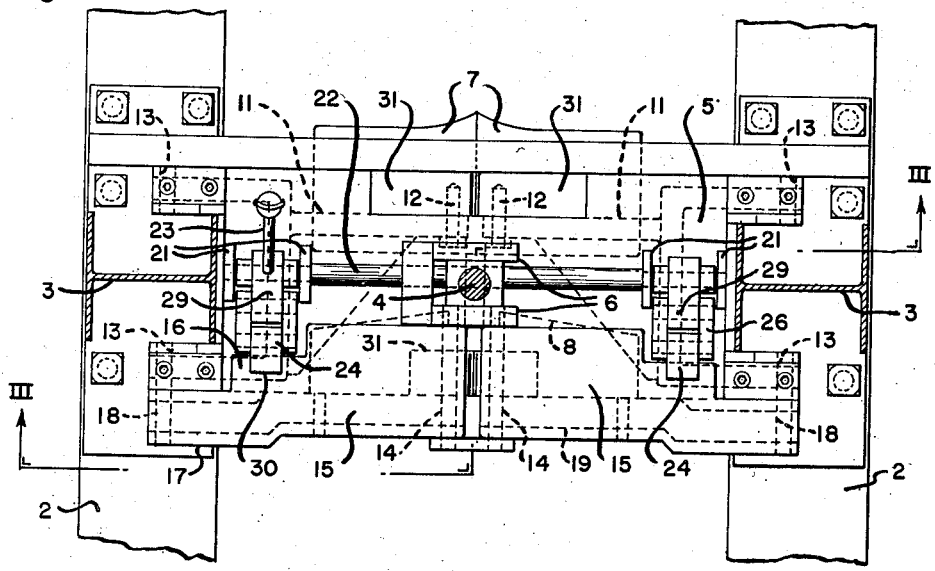
Figure 2 is a fragmentary horizontal cross-sectional view through a portion of the tool dressing machine, the section being taken at a level somewhat above the top of Figure 1.

Referring now more particularly to the drawings, the tool dressing machine comprises an elongated tool receiving bed comprising generally parallel H beams 2, the bed carrying means for supporting a tool to be dressed, the dressing and trimming dies and the dressing roll and means for operating it. All of those elements are shown in said copending application. Since the present application relates entirely to the dies and their operating mechanism I have for simplicity eliminated portions of the tool dressing and moving mechanism as well as the dressing roll and its operating mechanism. I have, however, shown fully the dressing and trimming dies and the mounting and operating means therefor.

Extending upwardly from the bed 2 are opposed H beams 3 which serve as portions of a support for a generally vertically mounted cylinder disposed above the bed, which cylinder has a piston operating therein with which is connected a piston rod 4. The H beams 3 also serve as a guideway extending transversely of the bed for guiding in vertical movements a head designated generally by reference numeral 5. The head 5 is connected with the piston rod 4 through a bracket 6. Thus movement of the piston in the cylinder causes movement of the head 5 along the vertical guideway formed by the H beams 3. The piston may be operated in the cylinder by any suitable fluid under pressure with control means as well known to those skilled in the art. By operation of the control means the head 5 is moved up and down.

Figure 3:
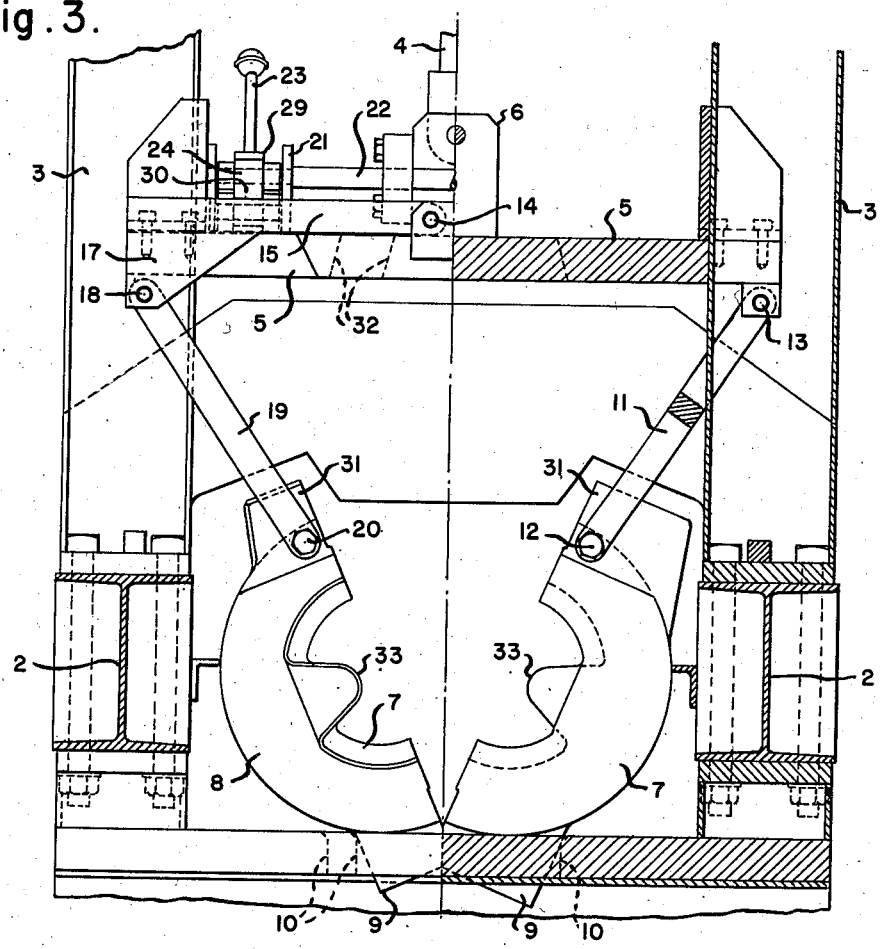
Figure 3 is a fragmentary vertical cross-sectional view taken on the staggered line III—III of Figure 2 but showing the dressing die and the trimming die in open position, half of the dressing die being shown at the right-hand half of Figure 3 and half of the trimming die being shown at the left-hand half of Figure 3.
Figure 4:
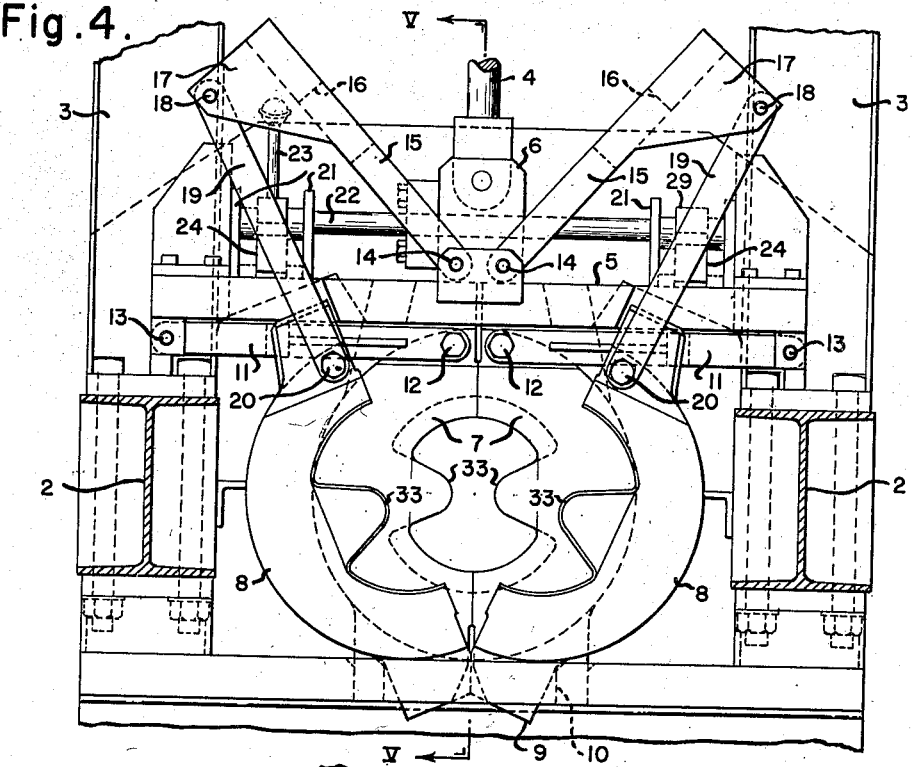
Figure 4 is a fragmentary vertical transverse cross-sectional view similar to Figure 1 but showing the trimming die open while the dressing die is closed.
Figure 5:
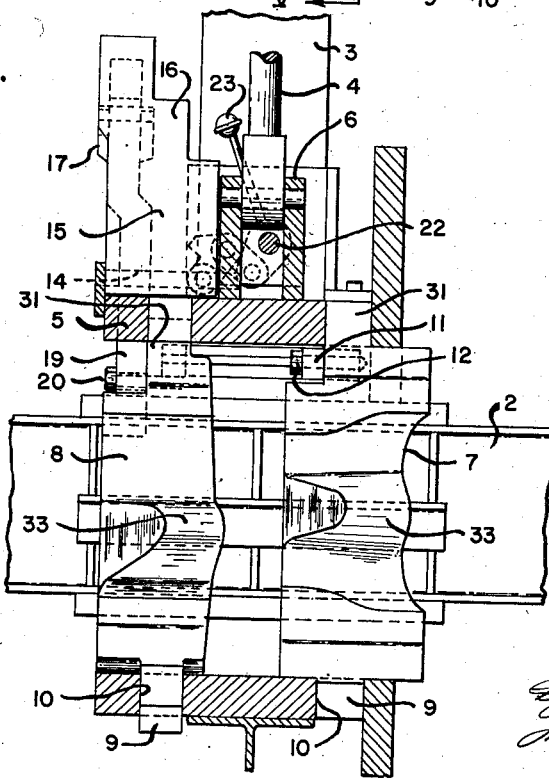
Figure 5 is a fragmentary central vertical longitudinal cross-sectional view taken on the line V—V of Figure 4.

Two dies are disposed in the guideway, a dressing die having opposed die halves 7 and a trimming die having opposed die halves 8. The shape of the dies may be conventional. As shown in Figure 5 the dressing die and the trimming die are disposed side by side in the bed but slightly spaced apart. Each of the dies has its cooperative die parts or halves mounted for relative angular turning movement as clearly shown in the drawings. Each die half has a downward projection 9 received within a slot 10 in the bed so that the die halves of both the dressing die and the trimming die may be rocked in and out between closed or operative position and open or inoperative position. In Figure 1 both dies are closed. In Figure 3 both dies are opened. In Figure 4 the dressing die is closed and the trimming die is open.

Opposed links 11 are arranged in generally end-to-end relationship, the inner end of each link 11 being pivoted to one of the die parts 7 of the dressing die at 12 and the outer end of each of those links being pivoted to the head 5 at 13. Thus when the head 5 moves down the dressing die is closed as shown in Figure 4 and when the head 5 moves up the dressing die is opened as shown in Figure 3. In Figure 3, due to the staggered section upon which the figure is taken, the right-hand die half which is seen is half of the dressing die. The left-hand end half of the dressing die and the left-hand link 11 connected therewith are behind the left-hand half of the trimming die and one of the trimming die operating links presently to be described. The dressing die halves are at all times connected with he head 5 by the links 11 so that whenever the head is moved downwardly the dressing die halves are closed as shown in Figures 1 and 4 and whenever the head is moved upwardly the dressing die halves are opened as shown in Figure 3.

Pivoted to the head 5 at 14 are two arms 15. Each of the arms 15 has a portion 16 adapted when the arms are in substantially horizontal position to lie atop the head. Each of the arms 15 has a downward projection 17 extending downwardly beside the head, and pivoted to each projection 17 at 18 is a trimming die operating link 19 which at its opposite end is pivoted to one of the trimming die halves 8 at 20.

The structure thus far disclosed permits movement of the dressing die halves 7 between closed and open positions by movement of the head 5 up and down while the trimming die halves 8 may remain in open position as shown in Figure 4, the arms 15 and links 19 partaking of relative movement about the respective pivotal connections during movement of the head without moving the trimming die halves. However, means now to be described are provided for holding the arms 15 down against the head 5 to prevent pivotal movement of the arms relatively to the head about the axes of the pivotal connections 14 and cause the arms to form in effect unitary portions of the head immovable with respect thereto.

Journaled in bearings 21 on the head is a transverse shaft 22. An operating lever 23 is connected with the shaft 22 for turning the same about its axis. At opposite sides of the center line of the head latches 24 are pivoted for turning movement on stub shafts 25 mounted on the head, each latch 24 being connected with the shaft 22 by a link 26. Each link 26 is pivoted to the corresponding latch 24 at 27 and is pivoted at 28 to a projection 29 fixedly carried by the shaft 22. Each latch 24 has a nose 30 adapted when the latch is in operative position as shown in Figure 6 to overlie a portion of the corresponding arm 15. Thus when the latches 24 are in operative position as shown in Figure 6 they hold the arms 15 down against the head 5 so that the arms 15 are in effect unitary with the head and move up and down with the head without any pivotal movement relatively to the head. When the arms 15 are thus latched to the head the axes of the respective pivotal connections 13 and those of the respective pivotal connections 18 are in line longitudinally of the bed as shown in Figure 3.

One of the latches is shown in inoperative position in Figure 5, in which position of the latches the arms 15 are not held down against the head 5 and the dressing die may be opened and closed while the trimming die remains open. Turning of the shaft 22 in the clockwise direction viewing Figures 5 and 6 from the position of Figure 5 to the position of Figure 6 operates both of the links 26 to move both of the latches 24 to operative position with their noses 30 overlying the arms 15 as shown in Figure 6. When the arms are thus latched to the head the dressing and trimming dies move synchronously between open and closed positions as in the tool dressing machine of said copending application.

Each of the four die halves has an upward projection 31 at its top and the head 5 has an opening 32 above each die so that when a die is closed and the head descends the projections 31 of that die enter the opening 32 in the head thereabove and the die is locked in closed position. When each die is in closed position the outer face of each of its lower projections 9 is against the corresponding face of the slot 10 in which it is disposed so that when the die is closed it is rigidly held in fixed position.

The advantage of my improved tool dressing machine may be demonstrated by considering that a tool is to be dressed which has become so short that the ends of the water courses remote from the bit end of the tool are closer to the bit end of the tool than the distance between the dressing die and the trimming die of the tool dressing machine. Each of the four die halves has an inward projection 33 shaped to enter one of the water courses of a tool to be dressed. Obviously if the water courses are not long enough to extend to the trimming die when the tool is being dressed the projections 33 of the trimming die halves will strike against the outer faces of the tool beyond the ends of the water courses and the trimming die cannot be closed. With the tool dressing machine of said copending application it would have been necessary to disconnect the trimming die halves from the head. Such disconnection is unnecessary in the present case, the mounting and operating means for the dies as above explained obviating the necessity thereof.

I have purposely refrained from showing and describing details of the tool dressing machine to which the present invention does not relate. All such details may be the same as in said copending application. I have herein completely shown and described the dies and their mounting and operating mechanism, that being the part of the tool dressing machine here involved.

While I have shown and described a present preferred embodiment of the invention it is to be distinctly understood that the invention is not limited thereto but may be otherwise variously embodied within the scope of the following claims.

I claim:

1. In a tool dressing machine, a dressing die having cooperative die parts adapted to be separated to render the dressing die inoperative and moved into cooperative relationship to render the dressing die operative, means for moving the dressing die parts into cooperative relationship, a trimming die having cooperative die parts adapted to be separated to render the trimming die inoperative and moved into cooperative relationship to render the trimming die operative, means for moving the trimming die parts into cooperative relationship and connecting means movable between operative position connecting the second mentioned means to the first mentioned means so that the trimming die is rendered operative when the dressing die is rendered operative and inoperative position disconnecting the second mentioned means from the first mentioned means so that the trimming die remains in inoperative position when the dressing die is rendered operative.

2. In a tool dressing machine, a dressing die having cooperative die parts adapted to be separated to render the dressing die inoperative and moved into cooperative relationship to render the dressing die operative, means for moving the dressing die parts into cooperative relationship, a trimming die having cooperative die parts adapted to be separated to render the trimming die inoperative and moved into cooperative relationship to render the trimming die operative, means for moving the trimming die parts into cooperative relationship, said means including linkage connected with the first mentioned means, and control means movable between a first position in which it constitutes a connection between the first mentioned means and the linkage causing operation of the linkage to move the trimming die to operative position when the dressing die is moved to operative position and a second position in which it is inoperative so that the linkage turns without moving the trimming die to operative position when the dressing die is moved to operative position.

3. In a tool dressing machine, a dressing die having cooperative die parts adapted to be separated to render the dressing die inoperative and moved into cooperative relationship to render the dressing die operative, means including a movable head for moving the dressing die parts into cooperative relationship, a trimming die having cooperative die parts adapted to be separated to render the trimming die inoperative and moved into cooperative relationship to render the trimming die operative, means connected with the head for moving the trimming die parts into cooperative relationship when the dressing die parts are moved into cooperative relationship and means mounted for shiftable movement to alter the connection of said last mentioned means with the head so that the trimming die remains in inoperative position when the dressing die parts are moved into cooperative relationship.

4. In a tool dressing machine, a dressing die having cooperative die parts adapted to be separated to render the dressing die inoperative and moved into cooperative relationship to render the dressing die operative, means including a movable head for moving the dressing die parts into cooperative relationship, a trimming die having cooperative die parts adapted to be separated to render the trimming die inoperative and moved into cooperative relationship to render the trimming die operative, bracket means pivoted to the head, means selectively fastening the bracket means to the head to move as a unit with the head and releasing the bracket means to move pivotally relatively to the head upon movement of the head and connections between the bracket means and the trimming die parts whereby the trimming die parts are moved into cooperative relationship upon movement of the head to move the dressing die parts into cooperative relationship when the bracket means are fastened to the head and the trimming die parts remain in inoperative position upon movement of the head to move the dressing die parts into cooperative relationship when the bracket means are released to move pivotally relatively to the head.

5. In a tool dressing machine, a dressing die having cooperative die parts adapted to be separated to render the dressing die inoperative and moved into cooperative relationship to render the dressing die operative, means including a movable head for moving the dressing die parts into cooperative relationship, a trimming die having cooperative die parts adapted to be separated to render the trimming die inoperative and moved into cooperative relationship to render the trimming die operative, bracket means pivoted to the head, means selectively fastening the bracket means to the head to move as a unit with the head and releasing the bracket means to move pivotally relatively to the head upon movement of the head and link means connecting the bracket means and the trimming die parts whereby the trimming die parts are moved into cooperative relationship upon movement of the head to move the dressing die parts into cooperative relationship when the bracket means are fastened to the head and the trimming die parts remain in inoperative position upon movement of the head to move the dressing die parts into cooperative relationship when the bracket means are released to move pivotally relatively to the head.

6. In a tool dressing machine, an elongated tool receiving bed, a guideway extending generally transversely of the bed, a head movable in the guideway, means for moving the head, a dressing die in the guideway having cooperative die parts adapted to be relatively angularly turned in one direction to open the dressing die and render it inoperative and to be relatively angularly turned in the opposite direction to close the dressing die and render it operative, a trimming die in the guideway having cooperative die parts adapted to be relatively angularly turned in one direction to open the trimming die and render it inoperative and to be relatively angularly turned in the opposite direction to close the trimming die and render it operative, two dressing die operating links respectively pivoted at one end to the head and at the other end to the respective dressing die parts to relatively angularly turn the dressing die parts upon movement of the head, two arms respectively pivoted to the head, two trimming die operating links respectively pivoted at one end to the respective arms and at the other end to the respective trimming die parts and means selectively fastening the arms against pivotal movement relatively to the head to cause the arms to form in effect unitary portions of the head immovable with respect thereto and releasing the arms for pivotal movement relatively to the head, so that when the arms are thus fastened the trimming die parts are relatively angularly turned upon movement of the head and when the arms are released the trimming die parts may remain open despite movement of the head and the arms and trimming die operating links may partake of relative movement about their respective pivotal connections during movement of the head without moving the trimming die parts.

7. In a tool dressing machine, an elongated tool receiving bed, a guideway extending generally transversely of the bed, a head movable in the guideway, means for moving the head, a dressing die in the guideway having cooperative die parts adapted to be relatively angularly turned in one direction to open the dressing die and render it inoperative and to be relatively angularly turned in the opposite direction to close the dressing die and render it operative, a trimming die in the guideway having cooperative die parts adapted to be relatively angularly turned in one direction to open the trimming die and render it inoperative and to be relatively angularly turned in the opposite direction to close the trimming die and render it operative, two dressing die operating links respectively pivoted at one end to the head and at the other end to the respective dressing die parts to relatively angularly turn the dressing die parts upon movement of the head, two arms respectively pivoted to the head, two trimming die operating links respectively pivoted at one end to the respective arms and at the other end to the respective trimming die parts, an operating member and latches operatively connected with the operating member to be moved thereby selectively into respective operative positions fastening the respective arms against pivotal movement relatively to the head to cause the arms to form in effect unitary portions of the head immovable with respect thereto and into respective inoperative positions releasing the respective arms for pivotal movement relatively to the head, so that when the arms are thus fastened the trimming die parts are relatively angularly turned upon movement of the head and when the arms are released the trimming die parts may remain open despite movement of the head and the arms and trimming die operating links may partake of relative movement about their respective pivotal connections during movement of the head without moving the trimming die parts.

8. In a tool dressing machine, an elongated tool receiving bed, a guideway extending generally transversely of the bed, a head movable in the guideway, means for moving the head, a dressing die in the guideway having cooperative die parts adapted to be relatively angularly turned in one direction to open the dressing die and render it inoperative and to be relatively angularly turned in the opposite direction to close the dressing die and render it operative, a trimming die in the guideway having cooperative die parts adapted to be relatively angularly turned in one direction to open the trimming die and render it inoperative and to be relatively angularly turned in the opposite direction to close the trimming die and render it operative, two dressing die operating links respectively pivoted at one end to the head and at the other end to the respective dressing die parts to relatively angularly turn the dressing die parts upon movement of the head, two arms respectively pivoted to the head, and adapted to lie in generally end-to-end relation to each other along the head with a portion of each arm atop the head, the arms being pivoted to the head at the adjacent ends of the arms, two trimming die operating links respectively pivoted at one end to the respective outer portions of the arms and at the other end to the respective trimming die parts and means selectively holding the arms down against the head to prevent pivotal movement of the arms relatively to the head and cause the arms to form in effect unitary portions of the head immovable with respect thereto and releasing the arms for pivotal movement relatively to the head, so that when the arms are thus held the trimming die parts are relatively angularly turned upon movement of the head and when the arms are released the trimming die parts may remain open despite movement of the head and the arms and trimming die operating links may partake of relative movement about their respective pivotal connections during movement of the head without moving the trimming die parts.

No references cited.